(12) United States Patent
Hoerle et al.

(10) Patent No.: US 9,376,604 B2
(45) Date of Patent: Jun. 28, 2016

(54) DEICER MIXING METHOD

(75) Inventors: Michael Hoerle, Broadview Heights, OH (US); Eric Busch, Broussard, LA (US); Craig J. Bush, Lansing, NY (US)

(73) Assignee: Cargill, Incorporated, Wayzata, MN (US)

( * ) Notice: Subject to any disclaimer, the term of this patent is extended or adjusted under 35 U.S.C. 154(b) by 1909 days.

(21) Appl. No.: 11/488,917

(22) Filed: Jul. 19, 2006

(65) Prior Publication Data

US 2009/0011125 A1    Jan. 8, 2009

Related U.S. Application Data

(62) Division of application No. 10/193,463, filed on Jul. 10, 2002, now Pat. No. 7,100,760.

(51) Int. Cl.
*C09K 3/00* (2006.01)
*C09K 3/18* (2006.01)
*B01J 2/00* (2006.01)
*B01J 2/10* (2006.01)

(52) U.S. Cl.
CPC .............. *C09K 3/185* (2013.01); *B01J 2/006* (2013.01); *B01J 2/10* (2013.01)

(58) Field of Classification Search
USPC ........................................................ 427/215
See application file for complete search history.

(56) References Cited

U.S. PATENT DOCUMENTS

| | | | | |
|---|---|---|---|---|
| 3,652,064 A * | 3/1972 | Lehnen et al. | ................... | 366/88 |
| 4,004,782 A * | 1/1977 | Jeppsen | .......................... | 366/14 |
| 4,245,915 A * | 1/1981 | Bracegirdle | .................... | 366/12 |
| 4,396,501 A * | 8/1983 | Morey | ............................. | 209/10 |
| 4,504,222 A * | 3/1985 | Christian | ....................... | 432/139 |
| 4,611,612 A * | 9/1986 | Obie et al. | ....................... | 134/65 |
| 4,976,977 A * | 12/1990 | Johnson et al. | ................. | 426/96 |
| 5,988,535 A * | 11/1999 | Kime | ............................. | 239/687 |
| 6,220,532 B1 * | 4/2001 | Manon et al. | ................. | 239/672 |
| 6,398,979 B2 * | 6/2002 | Koefod et al. | ................. | 252/70 |

FOREIGN PATENT DOCUMENTS

DE      29 08 410      9/1980
WO      01/64811 A2    9/2001

OTHER PUBLICATIONS

First page of corresponding Canadian Office Action, Jul. 2008

* cited by examiner

*Primary Examiner* — Robert Vetere

(57) ABSTRACT

An apparatus for applying a liquid coating to a deicer composition, methods of applying a liquid coating to a deicer composition, and solid deicer compositions that have been coated using the apparatus or method of the invention are disclosed. The apparatus includes a screw conveyor that has a housing, at least one screw with a plurality of flights, an inlet for uncoated deicer, an inlet for a liquid coating composition, and an outlet for deicer coated with the liquid coating composition. The screws contain protrusions or tabs that extend from the surrounding surface of the screw. These protrusions or tabs aid in the mixing of the solid deicer and the liquid coating composition in order to provide a well-mixed deicer that resists caking while avoiding losing the coating composition to leaching.

20 Claims, 2 Drawing Sheets

DEICER MIXING METHOD

CROSS-REFERENCE TO RELATED APPLICATION

This application is a divisional application of U.S. patent application Ser. No. 10/193,463, now U.S. Pat. No. 7,100,760 filed on Jul. 10, 2002 incorporated herein by reference.

FIELD OF THE INVENTION

The present invention relates to an apparatus for coating solid deicers. More particularly, the invention relates to a method and apparatus for coating solid deicers with a solution to depress the freezing point of the deicers, provide corrosion resistance, and improve their flowability; and to methods for coating solid deicers.

BACKGROUND

Solid deicers, such as rock salt or solar salt (sodium chloride) and abrasives, such as sand, are commonly applied to roads and other surfaces during winter months.

These solid deicers and abrasives are often pre-wetted before being stored or applied. Pre-wetting typically involves addition of a liquid to the solid deicer or abrasive in order to give it increased resistance to freezing, improved storage characteristics, enhanced flowability, corrosion resistance, and better deicing performance. Liquid brines of sodium chloride, calcium chloride, and magnesium chloride are often used for this purpose.

In order to optimize the use of the pre-wetting liquid, it is necessary to coat the solid deicer in a manner that distributes the liquid as uniformly as possible on the solid deicer. Problems can arise if the liquid is not uniformly distributed. For example, areas with excessive liquid will leach out from the solid deicer, while areas with inadequate liquid tend to clump and flow poorly. Thus, it is necessary to mix the deicer and liquid thoroughly. However, excessive mixing can cause the solid deicer to be crushed into small particles or "fines", making it undesirable for many deicing applications.

Therefore, a need exists for an apparatus and method for applying a pre-wetting liquid to a solid deicer that effectively coats the solid deicer without excessively crushing the solid deicer or forming fines.

SUMMARY OF THE INVENTION

The present invention is directed to an apparatus for applying a liquid pre-wetting composition to a solid deicer, to methods of applying a liquid pre-wetting composition to a solid deicer, and to solid deicer materials that have been coated using the apparatus or method of the invention.

The apparatus used to coat the solid deicer generally includes a screw conveyor. The conveyor has a housing, at least one screw with a plurality of flights, at least one inlet for uncoated deicer, at least one inlet for a liquid pre-wetting coating composition, and an outlet for the deicer that has been coated with the liquid coating composition. The screw contains protrusions or tabs that extend upward from the surrounding screw surface. These protrusions or tabs aid in the mixing of the solid deicer and the liquid pre-wetting composition, and they help produce a well-mixed deicer that resists caking and avoids loss of the pre-wetting composition to leaching during storage of the coated solid deicer (which can occur when the pre-wetting composition and solid deicer are not properly mixed).

In one implementation of the invention, the protrusions in the screw are formed from areas of the screw that have been partially cut free from the screw's major surface and have been bent upward away from screw's major surface. These protrusions comprise raised portions on the major surface that have been partially severed from the surrounding portions of the screw and been reoriented to extend away from the surrounding portions. When the protrusions are formed by cutting and bending a portion of the major surface, an opening in the screw adjacent to the raised portion is left behind. Normally the protrusions are positioned along the perimeter of the screw. In this implementation the raised portions are integrally formed with the major surface, and are actually formed from the major surface, of the screw. In an alternative implementation, the protrusions are formed by bonding or securing (such as by bolting or welding) protrusions along parts of the screw surface.

The conveyor screw aids in the mixing of the solid deicer and liquid pre-wetting composition, and optionally contains protrusions that help with the mixing. Normally the screw contains at least 5 raised portions or protrusions, more commonly 10 raised portions or protrusions, and even more commonly at least 15 protrusions, and frequently 20 or more protrusions. The protrusions typically have an exposed surface area on one side of at least 10 square inches. The raised portions on each flight of the screw may have an exposed surface area on at least one side ranging up to 15 percent of the surface area of the flight. Although the number of raised portions per flight can be varied, it is desirably from 2 to 8, commonly from 3 to 6, and most typically 4 to 5.

The invention is also directed to a method of coating salt to be used as a deicer. The method includes providing a salt composition, such as sodium chloride, magnesium chloride, or a combination thereof; providing a liquid deicer composition; and providing a screw conveyor. The screw conveyor has a major surface and a plurality of raised portions extending upward from the major surface. The solid deicer composition and pre-wetting composition are added into the screw conveyor and the combination is advanced through the conveyor to produce a coated solid deicer composition.

Various liquid pre-wetting compositions can be used with the method and apparatus. The compositions are typically liquid deicers and they can be of various formulations. For example, on a water free basis they often contain from 1.0 to 70 percent by weight molasses solids, from 0.1 to 40 percent by weight magnesium chloride, and from 0 to 30 percent by weight of a corrosion inhibitor. In certain implementations the liquid deicer composition comprises less than 45 percent by weight molasses solids. In specific embodiments the liquid deicer composition has less than 45 percent by weight molasses solids. Suitable molasses includes cane molasses, beet molasses, citrus molasses, wood molasses, grain molasses, and combinations thereof.

If magnesium chloride is present, it may be derived from various sources. In one implementation the magnesium chloride is derived from liquid bittern, including liquid bittern containing 30 percent magnesium chloride. In some implementations the bittern contains less than 20 percent magnesium chloride by weight. Various corrosion inhibitors can be used. When corrosion inhibitors are used, suitable corrosion inhibitors include, but are not limited to, phosphate salts, such as orthophosphates, polyphosphates, pyrophosphates, and organic phosphonates. Also, triethanolamine can be used as a corrosion inhibitor in accordance with the invention. Sodium gluconate can also be added to provide corrosion protection in addition to these other corrosion inhibitors or in place of these corrosion inhibitors.

The solid deicer used with the invention can include sodium chloride, calcium chloride, urea, acetate salts, and combinations thereof. Suitable solid deicers include sodium chloride and magnesium chloride mixtures. A useful deicer composition after coating with liquid pre-wetting agent contains less than 13 percent by weight magnesium chloride, less than 2.0 percent monosodium phosphate, less than 5.0 percent by weight molasses solids, and about 80 to 96 percent by weight sodium chloride, all on a dry solids basis. Generally, even "solid deicers" will contain some water and may contain some liquid, such as liquid coating the deicer as a result of rain, condensation, or other sources.

The above summary of the present invention is not intended to describe each discussed embodiment of the present invention. This is the purpose of the detailed description which follows.

FIGURES

Other aspects and advantages of the invention will become apparent upon reading the following detailed description and upon reference to the drawings, in which.

Figure 1:
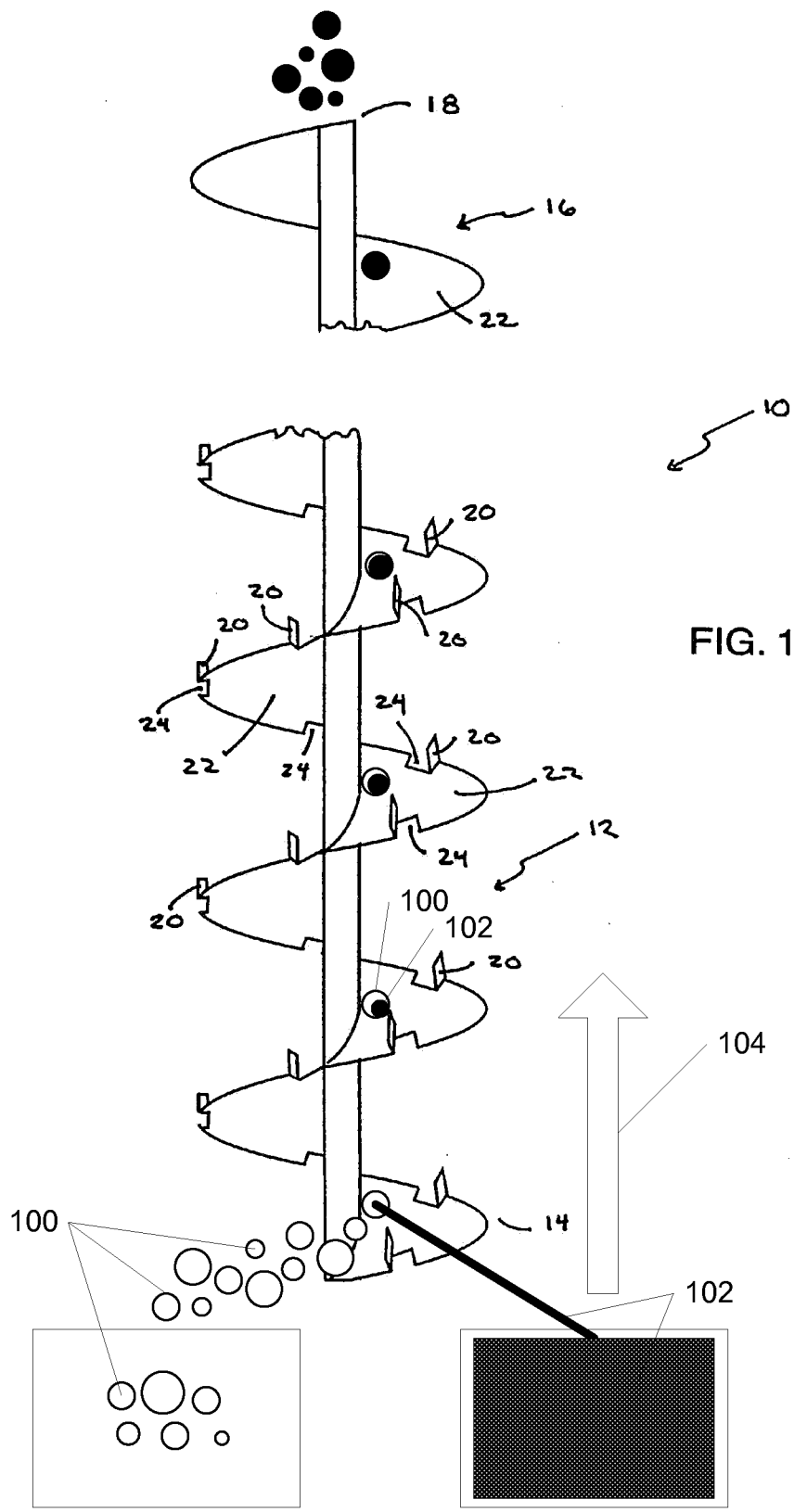
FIG. 1 is side elevational view of a conveyor screw constructed and arranged in accordance with an implementation of the invention.

While the invention is susceptible to various modifications and alternative forms, specifics thereof have been shown by way of example in the drawings and will be described in detail. It should be understood, however, that the intention is not to limit the invention to the particular embodiments described.

DETAILED DESCRIPTION

The present invention is directed to methods of applying a liquid pre-wetting coating to a deicer composition, and to solid deicer compositions that have been coated using method of the invention. The various components of the apparatus and ingredients for the liquid pre-wetting coating will now be described in greater detail, along with methods of applying the pre-wetting coating and to characteristics of coated deicer compositions made in accordance with the invention.

A. General Screw Conveyor Apparatus

The apparatus for applying a liquid pre-wetting coating includes a screw conveyor used to mix the solid deicer 100 and the liquid pre-wetting composition 102. The screw conveyor typically includes a housing containing at least one rotating conveyor screw that advances the deicer from an inlet end to an outlet end, in the direction of arrow 104. The screw conveyor should be large enough to effectively mix significant quantities of salt. Thus, any effective length of screw conveyor can be used with the invention. In some implementations, the screw conveyor contains a single or multi-piece screw that is at least 5 feet long, the screw is commonly greater than 10 feet long, more commonly at least 15 feet long, and even more commonly greater than 20 feet long. Suitable conveyor screws can be, for example, about 24 feet long.

The screw conveyor is configured so that the liquid pre-wetting composition can be easily added to the solid deicer. Various application techniques are suitable for applying the liquid, and can include pouring or injecting the liquid into the conveyor housing at the inlet to the conveyor housing where the solid deicer enters the housing. The liquid can enter the housing at one location or multiple locations, and normally enters in a continuous stream but alternatively can enter in a pulsed or intermittent flow. Also, the liquid can enter as a spray. However, in most implementations the liquid enters the housing in the first half of the conveyor housing, and even more typically in the first quarter of the conveyor housing, in order to provide as much opportunity as possible to mix the solid deicer and liquid pre-wetting composition.

B. Conveyor Screw

In specific implementations of the invention the conveyor includes a screw that mixes the solid deicer and liquid pre-wetting composition. The conveyor screw permits continuous addition of a liquid deicer to the solid deicer material in a manner that provides relatively uniform coating of the solid deicer, while avoiding excessive deterioration of the size of the solid deicer particles. In particular, the conveyor screw permits thorough mixing of the pre-wetting liquid onto the solid deicer, improving the flowability of the solid deicer while avoiding excessive leaching of the liquid pre-wetting composition from the coated solid deicer. In addition, the conveyor screw facilitates this uniform coating of the solid deicer without excessive grinding of the solid into undesirable fines.

Screws suitable for use with the present invention can take various forms, and be of various diameters and lengths. Typically the screw is large enough to permit high speed production of coated deicer, and thus the screws usually have an outer diameter greater than 12 inches. The diameter can be from 18 to 36 inches in some embodiments, more typically from about 20 to 28 inches, and even more typically about 24 inches. However, it is possible to make the conveyor screws smaller or larger, depending upon the amount of coated deicer that is desired.

The conveyor screws can be of any length that effectively mixes the solid deicer and liquid pre-wetting material. The length of the conveyor screws used with the present invention is typically at least 10 feet, more typically at least 15 feet, and even more typically from 20 to 25 feet. Longer and shorter conveyor screws are also appropriate under some circumstances. The screws can be one single piece or can be multiple pieces assembled together.

Each conveyor screw has multiple flights, with each flight being defined as a length of screw that has a perimeter extending 360 degrees around the screw. Generally the screw has greater than 4 flights, frequently more than 8 flights, and can have greater than 12 flights. In one example implementation the screw is 24 inches in diameter and has fights that are two feet long, yielding a total of 12 flights in a 24 foot conveyor screw.

In one implementation at least some of the flights have protrusions or tabs extending from the main screw surface (that portion that forms a helix along the screw's length). The protrusions assist in producing a well mixed coated deicer. The mixing protrusions or tabs can be aligned so that they form a right angle (90 degrees) with the adjacent major surface of the screw. The angle is generally about 90 degrees, but can vary from this angle in various implementations of the invention. It is normally not necessary to be exactly 90 degrees, and thus the angle can be about 90 degrees with some variation from manufacturing or use. In addition, other implementations of the invention can have the protrusions or tabs form a smaller angle with the surrounding screw surface. In certain implementations this angle is from 75 to 90 degrees, in other implementations this angle is from 60 to 90 degrees, and in yet other implementations this angle is 45 degrees or greater. In some implementations the angle is less than 45 degrees. The protrusions generally extend in a direction toward the discharge end of the conveyor. In alternative embodiments some or all of the protrusions can also extend toward the inlet of the conveyor.

As stated above, each screw has multiple mixing protrusions. In most implementations the mixing protrusions are located near the inlet to the screw conveyor, or at least in the first half of the screw conveyor. However, additional protrusions can be located at various locations, including near the outlet end of the conveyor in some embodiments. The mixing protrusions are normally located along the perimeter of the screw, and are desirably spaced in manner that more than one protrusion can be positioned on a screw flight.

When two or more protrusions are placed per flight, the protrusions are positioned so as to be less than or equal to about 180 degrees apart. When three or more protrusions are placed per flight, the protrusions are typically positioned so as to be less than or equal to about 120 degrees apart. When four or more protrusions are placed per flight, the protrusions are typically positioned so as to be less than or equal to about 90 degrees apart, and when five or more protrusions are placed per flight the protrusions are typically positioned so as to be less than or equal to about 72 degrees apart.

As stated above, the general location for most or all of the protrusions is in the first half of the conveyor screw. These protrusions are usually uniformly placed around the conveyor screw, but it is possible to configure the protrusions in groups separated by gaps in the screw that do not contain protrusions. Each screw typically has one or more protrusions, normally more than 10 protrusions, and frequently greater than 20 protrusions.

The protrusions should be large enough to facilitate thorough mixing of the solid deicer and coating liquid, without being so large that the mechanical forces excessively crush the deicer and turn it into fines. Various sizes of protrusions can be used, and they can be modified in number, size, and position in the various implementations. For example, on a 24-inch conveyor screw the protrusions can be about 3 inches wide (the measurement of the protrusion cut from the screw along the cut following the radius of the screw) and about 4 inches long (the measurement of the protrusion cut from the screw along the line cut along the circumference of the screw). Larger and smaller protrusions can be used, but they should be selected to provide adequate mixing without excessive crushing of the solid deicer or clogging of the conveyor. For example, a protrusion on a 24 inch diameter conveyor screw that is 1 inch wide and 4 inches long will mix the solid deicer and liquid pre-wetting composition, but not as well as one that is 3 inches wide. Also, a 4 inch wide by 6 inch long protrusion on a 24 inch diameter conveyor screw will cause mixing, but can result in significantly higher crushing of the solid deicer than that from a 3 inch by 4 inch protrusion.

One way to form each of the protrusions is by making two cuts along the edge of the screw to form a tab that can be bent up away from the screw surface. A first cut runs generally along the radius of the screw while the second cut runs generally parallel to the outer edge of the screw to leave an approximately rectangular tab that is secured by only one edge to the rest of the screw. After these two cuts have been made the tab is bent away from the screw surface so that it is aligned more with the axis of the screw than with the surface of the screw from which it has been partially cut.

Figure 2:
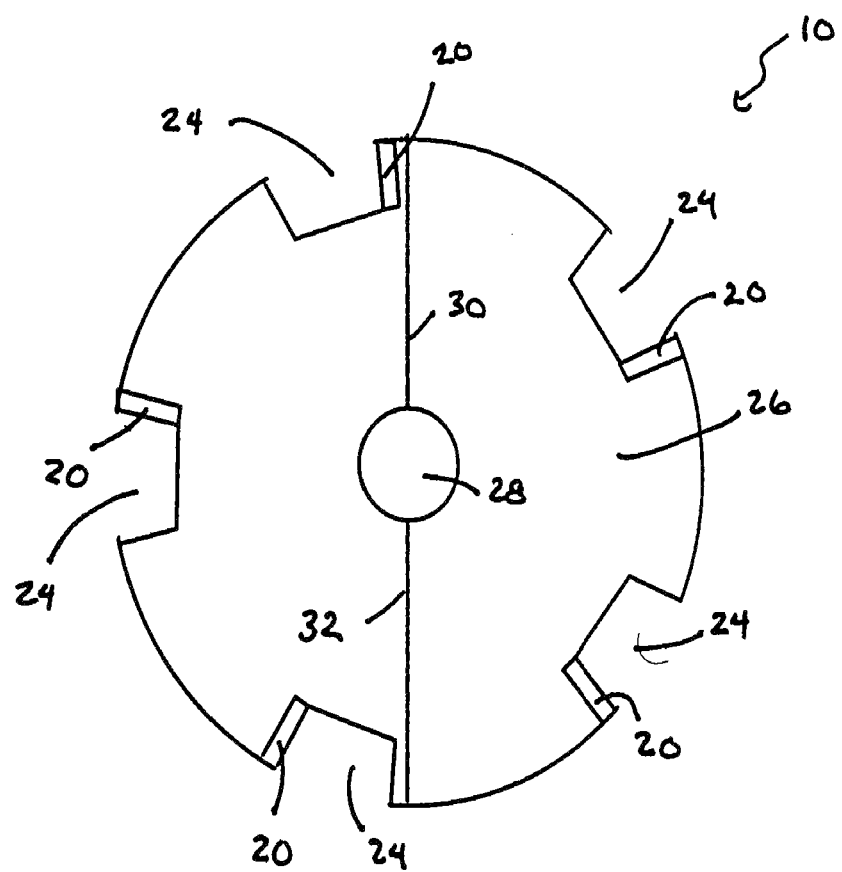
FIG. 2 is an end view of the lower portion of the conveyor screw shown in FIG. 1.

In reference now to the figures, an example conveyor screw constructed in accordance with the invention is shown in FIG. 1. Conveyor screw 10 is depicted in two partial views, with first portion 12 near the input end 14 and a second portion 16 near output end 18. The conveyor screw 10 contains numerous protrusions 20 that aid in the mixing of the solid deicer and liquid pre-wetting composition. The protrusions 20 shown in this example are formed by cutting a portion of the major surface 22 of the screw and bending it upward. Gaps 24 are left in the major surface 22 where the protrusions 20 had previously existed. In the conveyor screw 10 shown in FIG. 1 the protrusions are positioned only on the first portion 12 of the screw near the input end 14, while the opposite end does not have protrusions. However, as noted earlier, the protrusions can be positioned in various configurations, and some such protrusions can be positioned near the discharge end. In reference now to FIG. 2, a top elevational view of one flight 26 from the conveyor screw 10 is shown. The depicted flight has five protrusions 20 and five gaps 24. In addition, the center axis 28 is shown and the upper edge 30 is depicted.

C. Solid Deicer

The solid deicer used with the invention can include sodium chloride, magnesium chloride, calcium chloride, urea, acetate salts, and combinations thereof. Suitable solid deicers include sodium chloride and magnesium chloride mixtures. The solid deicers can include rock salt, solar salt, other salt sources, and combinations thereof. The solid deicers are generally prepared in advance of the addition of the pre-wetting liquid so that it contains particles of a size suitable for application by mechanized equipment (such as salt spreading trucks) onto roadways or other surfaces requiring deicing. Thus, it is desirable to preserve the general size of the solid deicers during the mixing and coating process. However, some changes in the size of the solid deicer material normally occurs, but these changes are desirably kept to a minimum to avoid formation of large quantities of small deicer particles known as fines.

D. Liquid Coating Composition

Various liquid coating compositions are suitable for use with the present invention as the pre-wetting agent. Often they include or comprise a liquid deicer. The liquid deicer compositions typically depress the freezing point of solid deicers or abrasives to which they are applied and inhibit corrosion. Thus, the compositions aid in prevention of freezing and hardening of solid deicers into large pieces that are difficult to apply, and the liquid pre-wetting agent assists in reducing corrosion of application equipment and material that comes in contact with the deicer.

In specific implementations the liquid deicer composition can include molasses solids, magnesium chloride, and a corrosion inhibitor. In one such implementation the liquid deicer composition includes from 1.0 to 70 percent molasses solids, from 0.1 to 40 percent magnesium chloride, and from 0 to 30 percent of a corrosion inhibitor.

As used herein, the term "molasses solids" refers to the components of molasses that are not water, such as various carbohydrates (e.g. sugars) and proteins. Typical commercial grade molasses compositions used with the present invention are approximately 40 to 95 percent molasses solids, more typically approximately 70 to 85 percent solids. Specific suitable molasses compositions have about 80 percent solids. Suitable molasses includes cane molasses, beet molasses, citrus molasses, wood molasses, grain molasses, and combinations thereof.

The magnesium chloride may be derived, for example, from liquid bittern. As used herein, liquid bittern is a product derived from sea salt production, and is the liquid remaining after removal of sodium chloride from seawater. Liquid bittern normally contains water along with a high concentration of magnesium chloride and lower concentrations of other salts. In most implementations the liquid bittern contains from 20 to 35 percent magnesium chloride. However, in other implementations liquid bittern contains less than 20 percent magnesium chloride.

Suitable corrosion inhibitors include phosphate salts, such as orthophosphates, polyphosphates, pyrophosphates, and organic phosphonates. Also, triethanolamine can be use as a corrosion inhibitor in accordance with the invention. Sodium gluconate is also acceptable as a corrosion inhibitor. Diammonium phosphate and monosodium phosphate are two specific phosphate salts that can be used individually or together to provide corrosion inhibition. Calcium phosphates are also suitable for use with the invention.

E. Coated Solid Deicer

The resulting coated deicer composition can contain one or more phosphate salts, molasses solids, magnesium chloride, and sodium chloride. The solid deicer is normally present in a significantly greater quantity than the molasses solids or the corrosion inhibitor. Typically the amount of solid deicer is greater than twice the amount of molasses solids, and even more typically greater than ten times the amount of the molasses solids. Specific embodiments have at least 0.5 percent by weight phosphate salt, at least 0.5 percent by weight molasses solids, at least 2.0 percent by weight magnesium chloride, and at least 70 percent by weight sodium chloride.

Example concentrations for the various components are 0.5 to 2.0 percent by weight of a phosphate salt, 0.5 to 2.0 percent by weight molasses solids, 2 to 6 percent by weight magnesium chloride, and 80 to 97 percent by weight sodium chloride. These percentages are all given as relative percentages to the other ingredients that are described. Additional ingredients (such as sand or water) can also be added to the composition, but do not change the relative percentages of these ingredients.

Suitable specific compositions that can be used as a deicer can include greater than 0.5 percent by weight magnesium chloride, greater than 1.0 percent by weight molasses solids, and greater than 80 percent by weight sodium chloride. For example, a composition can contain from 0.5 to 13 percent by weight magnesium chloride, from 1.0 to 3.0 percent by weight molasses solids, and from 85 to 96 percent by weight sodium chloride. Specific compositions contain from 0.5 to 1.5 percent by weight monosodium phosphate, while other compositions contain up to 2.0 percent by weight diammonium phosphate.

Other example composition contains 0.5 to 1.5 percent by weight monosodium phosphate, 1.5 to 2.5 percent by weight liquid bittern, 1.5 to 2.5 percent by weight cane molasses solids, and 90 to 96.5 percent by weight sodium chloride. The liquid bittern in this composition is typically from about 30 to 35 percent magnesium chloride. Thus, the composition contains from about 0.5 to 1.0 percent magnesium chloride. Another suitable composition comprises 0.5 to 1.5 percent by weight monosodium phosphate, 0.5 to 1.0 percent by weight diammonium phosphate, 1.5 to 2.5 percent by weight cane molasses solids, and 90 to 96.5 percent by weight sodium chloride. Yet another suitable composition comprises 0.5 to 2.0 percent by weight monosodium phosphate, 1.5 to 2.5 percent by weight cane molasses solids, 1.5 to 2.5 percent chloride salt (such as magnesium chloride or calcium chloride), and 90 to 96.5 percent by weight sodium chloride. A further acceptable composition contains cane molasses, liquid magnesium chloride, and sodium gluconate. Other ingredients may also be included. For example, in one implementation the composition has less than about 10 percent cane molasses, less than about 10 percent liquid magnesium chloride, less than about 10 percent magnesium chloride hexahydrate, less than about 5 percent diammonium phosphate, and less than about 5 sodium gluconate, along with solid sodium chloride. One specific composition containing sodium gluconate has about 2 percent cane molasses, 2 percent liquid magnesium chloride (30 percent solution), about 7 percent magnesium chloride hexahydrate, about 1 percent diammonium phosphate, and about 1 percent sodium gluconate, along with sodium chloride.

F. Method of Adding the Liquid Pre-Wetting Composition

The conveyor apparatus of the invention is used to mix solid deicer and a liquid pre-wetting composition, normally a liquid deicer. Solid deicer and the liquid pre-wetting composition are normally added continuously to the conveyor and mixed as they travel from the inlet end to the discharge end.

As described above, many different pre-wetting liquids can be added to the solid deicer. Also, the pre-wetting compositions can be added in different quantities depending upon the nature of the liquid and the desired application. In most implementations from 5 to 20 gallons of pre-wetting agent are added per ton of solid deicer. Even more typically about 8 to 16 gallons are added per ton. In one implementation a combination of molasses and liquid magnesium chloride is added to the solid deicer. For example, approximately 4 gallons of molasses and 4 gallons of liquid magnesium chloride can be added per ton of salt. Alternatively, 2 gallons of molasses and 8 gallons of liquid magnesium chloride can be added to the solid deicer.

The solid deicer and the liquid pre-wetting composition should be mixed sufficiently that excess liquid does not leach from piles of stored deicer. One way to determine if the materials are properly mixed is to process approximately 100 tons of solid deicer and form it into a pile. If liquid pre-wetting agent leaches from the pile and accumulates within 24 hours the mixture is generally not adequately mixed or contains too much liquid pre-wetting agent.

Also, the composition should not contain excessive fines, which include solid deicers that pass through a 30 mesh (a mesh having 30 by 30 holes per square inch). Fines can be problematic because they can cause caking or solidification of the deicer during storage or application. In general the amount of fines, by weight, of the solid deicer after addition of the liquid pre-wetting composition should be less than 15 percent, more desirably less than 12 percent, and even more desirably below 9 percent. The amount of fines preferably does not increase significantly during addition of the liquid pre-wetting composition and mixing. Generally it is desirable that the fines not go up more than 30 percent from their premixing level, and more desirably does not go up more than 20 percent, and even more desirably does not go up more than 10 percent.

While the present invention has been described with reference to several particular implementations, those skilled in the art will recognize that many changes may be made hereto without departing from the spirit and scope of the present invention.

We claim:

1. A method of coating salt to be used as deicer, the method comprising:

providing a solid salt composition containing sodium chloride;

providing a liquid deicer composition;

providing a screw conveyor comprising an inlet end, an outlet end, and a screw, wherein the screw comprises a shaft and a helical screw surface mounted to the shaft, wherein:

a plurality of raised portions extend upward from the screw surface along the peripheral margin of the screw surface with gaps on the screw surface where the raised portions are located; and adding the solid salt composition and liquid deicer composition into the screw conveyor at the inlet end of the screw conveyor and increasingly intermixing the solid salt composition and liquid deicer through a length of the screw conveyor to produce a coated salt deicer composition at the outlet end.

2. The method of claim 1, wherein the liquid deicer composition comprises, on a water free basis, at least:
  from 1.0 to 70 percent by weight molasses solids;
  from 0.1 to 40 percent by weight magnesium chloride; and
  from 0 to 30 percent by weight of a corrosion inhibitor.

3. The method of claim 2, wherein the liquid deicer composition further comprises from 90 to 96.5 percent by weight sodium chloride.

4. The method of claim 1, wherein the liquid deicer composition comprises less than 45 percent by weight molasses solids.

5. The method of claim 1, wherein the liquid deicer composition comprises, on a water free basis:
  at least 0.5 percent by weight magnesium chloride;
  at least 0.5 percent by weight molasses solids; and
  at least 80 percent by weight sodium chloride.

6. The method of claim 1, wherein the step of providing a solid salt composition containing sodium chloride further includes mixing the sodium chloride with magnesium chloride.

7. The method of claim 1, wherein the liquid deicer composition comprises, on a water free basis:
  less than 10 percent liquid magnesium chloride;
  less than 10 percent magnesium chloride hexadrate;
  less than 5 percent diammonium phosphate; and
  less than 5 percent sodium gluconate.

8. The method of claim 7, wherein the liquid deicer composition further includes solid sodium chloride.

9. The method of claim 1, wherein the step of providing a liquid deicer composition includes providing between 5 and 20 gallons of liquid deicer composition per ton of salt composition.

10. A method of coating salt to be used as deicer, the method comprising:
  providing a solid salt composition;
  providing a liquid deicer composition;
  providing a screw conveyor having an inlet and an outlet and containing a screw comprising a shaft and a helical screw surface mounted to the shaft, wherein a plurality of raised portions extend upward from the screw surface along the peripheral margin of the screw surface with gaps on the screw surface where the raised portions are located; and
  continuously adding the solid salt composition and liquid deicer composition into the inlet end of the screw conveyor and combining the solid salt composition and liquid deicer along the length of the conveyor to produce a coated solid salt deicer composition at the outlet end.

11. The method of claim 10, wherein the step of providing a solid salt composition includes combining molasses and liquid magnesium chloride with the solid salt composition.

12. The method of claim 11, wherein 4 gallons of molasses and 4 gallons of liquid magnesium chloride are added per one ton of solid salt composition.

13. The method of claim 11, wherein 2 gallons of molasses and 8 gallons of liquid magnesium chloride are added per one ton of solid salt composition.

14. The method of claim 10, wherein the step of providing a solid salt composition includes filtering out particles of the solid salt composition that are smaller than a predetermined size.

15. A method of coating salt to be used as deicer, the method comprising:
  providing a solid salt composition containing sodium chloride;
  providing a liquid deicer composition including a corrosion inhibitor;
  providing a screw conveyor having an inlet at a first end of the screw conveyor and an outlet end at an opposing longitudinal end of the screw conveyor and containing a screw with a diameter greater than 12 inches and comprising a shaft and a helical screw surface mounted to the shaft, wherein a plurality of raised portions extend upward from the screw surface along the peripheral margin of the screw surface with gaps on the screw surface where the raised portions are located; and
  continuously adding the solid salt composition and the liquid deicer composition into the inlet end of the screw conveyor and combining the solid salt composition and liquid deicer along the length of the conveyor to produce a coated salt deicer composition at the outlet end.

16. The method of claim 15, wherein the step of providing a pre-wetting solution including a corrosion inhibitor includes providing a composition comprising, on a water free basis, at least:
  from 1.0 to 70 percent by weight molasses solids;
  from 0.1 to 40 percent by weight magnesium chloride; and
  from 0 to 30 percent by weight of a corrosion inhibitor.

17. The method of claim 15, wherein the pre-wetting composition comprises less than 45 percent by weight molasses solids.

18. The method of claim 15, wherein the step of providing a solid salt composition containing sodium chloride further includes mixing the sodium chloride with magnesium chloride.

19. The method of claim 15, wherein the pre-wetting composition further includes solid sodium chloride.

20. The method of claim 15, wherein the step of providing a pre-wetting composition includes providing between 5 and 20 gallons of liquid deicer composition per ton of salt composition.

* * * * *